Figure 1:
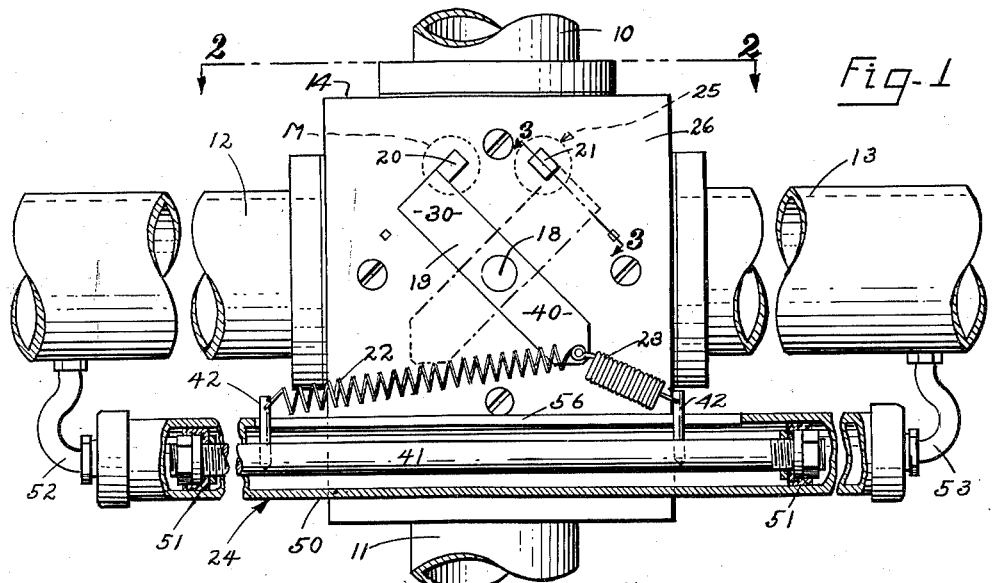

April 1, 1952  R. H. THOMPSON ET AL  2,591,216
VALVE OPERATING MECHANISM
Filed Nov. 28, 1944
2 SHEETS—SHEET 1

Inventors
Robert Hurd Thompson
Herbert Harvey
By
Attorney

April 1, 1952  R. H. THOMPSON ET AL  2,591,216
VALVE OPERATING MECHANISM
Filed Nov. 28, 1944  2 SHEETS—SHEET 2

Inventors
Robert Hurd Thompson
Herbert Harvey

By

Attorney

Patented Apr. 1, 1952

2,591,216

UNITED STATES PATENT OFFICE 2,591,216

VALVE OPERATING MECHANISM

Robert Hurd Thompson and Herbert Harvey, Los Angeles, Calif., assignors, by mesne assignments, to United States Steel Company, a corporation of New Jersey Application November 28, 1944, Serial No. 565,551

6 Claims. (Cl. 137—139)

This invention has to do with a valve operating mechanism, that is, with a mechanism for operating a valve or like device, and it is a general object of the invention to provide a simple, effective and dependable operating mechanism that can be advantageously used in connection with a remote control means.

There are various situations where a valve, or the like, requires an operating mechanism and there are many situations where such a mechanism requires operation through a remote control means. In referring to the mechanism of the present invention as being a valve operating mechanism we do not wish it understood that the invention is thereby limited to the operation of a valve, but wish it understood that the mechanism can be employed for operating any device such as a valve, or the like.

A general object of the invention is to provide an operating mechanism of the general character referred to which involves few simple parts that are sturdy of construction and dependable in operation. The mechanism of the present invention is free of delicate parts or mechanisms requiring fine adjustment or fit and it is characterized by few sturdy parts which are durable and highly dependable in operation.

It is another object of our present invention to provide an operating mechanism of the general character referred to which can utilize various operating means or mediums and which can be advantageously operated by means of fluid pressure. In accordance with the broader principles of our invention the power or actuating force employed by the mechanism may be any suitable force that may be available. As an example, the mechanism may utilize fluid pressure as the actuating medium and this makes the invention particularly suited for the operation of a valve, or the like, as a differential of pressure created by operation of the valve may be utilized as the means for actuating the operating mechanism.

Another object of this invention is to provide an operating mechanism of the general character referred to which can be advantageously coupled with a remote control means. In the preferred form of the invention the operating mechanism is under control of simple electromagnets so that impulses communicated to the mechanism through simple electrical circuits are all that is necessary for complete and dependable control.

Figure 2:
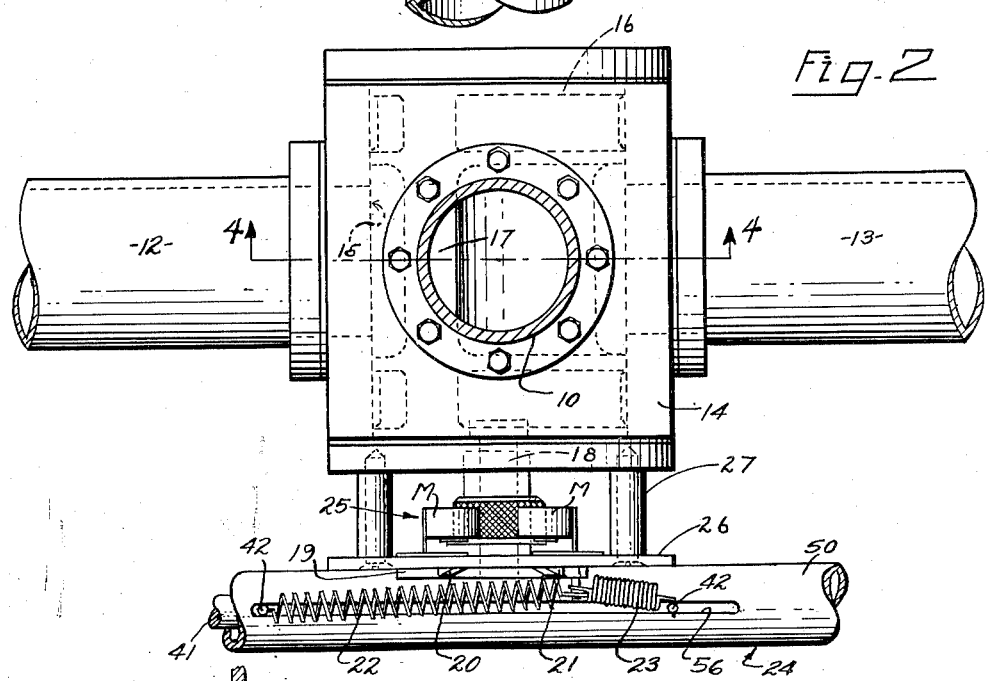
Figure 3:
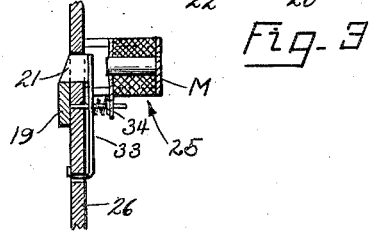
Figure 4:
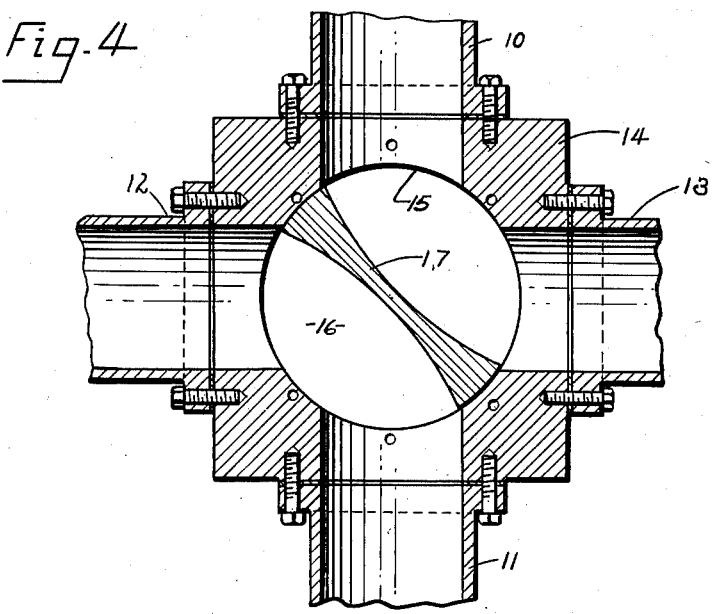
Figure 5:
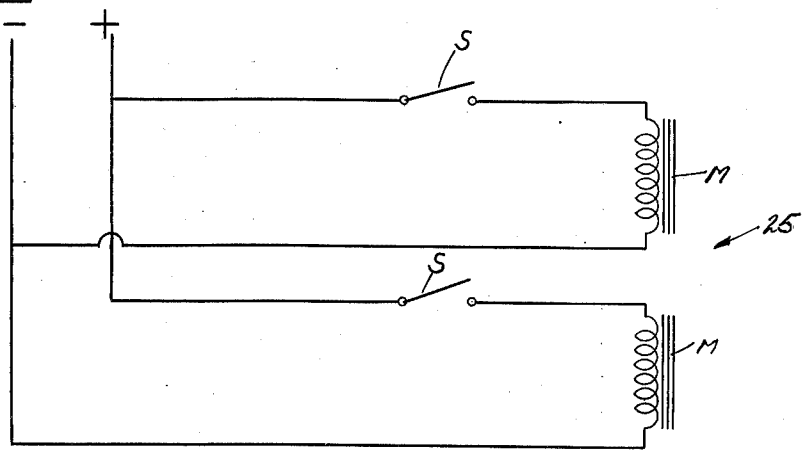

The various objects and features of our invention will be fully understood from the following detailed description of a typical preferred form and application of the invention, throughout which description reference is made to the accompanying drawings, in which:

Fig. 1 is a front view of a preferred form of the control mechanism provided by our invention with certain parts broken away to show in section. Fig. 2 is a plan view of the mechanism, being a view taken substantially as indicated by line 2—2 on Fig. 1. Fig. 3 is an enlarged detailed sectional view taken at one of the latches showing the relationship of the latch to the operating lever and to the control magnet. Fig. 4 is a transverse sectional view of the valve shown in the drawings, being a view taken substantially as indicated by line 4—4 on Fig. 2, and Fig. 5 is a simple diagram of a control circuit that may be used in connection with the invention.

The operating mechanism that we have provided can be used to advantage in operating any suitable device requiring successive operations, as for instance operation back and forth between two positions, and it is particularly suited for use in connection with a remote control means. For purpose of example and without in any way limiting the scope or range of application of the invention we have shown it as applied to a valve which connects and controls flow between a plurality of conduits and we have shown it in a form wherein it is operated by electrical impulses from remote points.

The valve illustrated in the drawings is connected between a high pressure inlet conduit 10, a low pressure exhaust or outlet conduit 11, and two distributing conduits 12 and 13. The particular valve shown is of the rotary or plug type and involves a body 14 with a bore 15 and a plug 16 which is rotatably supported in a bore of the body.

The high pressure conduit 10 connects into one side of the body while the low pressure or exhaust conduit 11 connects to the opposite side of the body. The distributing conduits 12 and 13 are located at right angles to the conduits 10 and 11 and connect into opposite sides of the body. The result of this arrangement is as is shown in Fig. 4, a distribution of the conduits around the body.

The plug 16 is rotatably supported in the bore 15 of the body and has a central portion in the form of a diametrically disposed web 17. The plug is rotatable in the body, for instance, it may be operated back and forth through an angle of 90° from a position such as is shown in Fig. 4 where it establishes comunication between conduits 10 and 12 and 11 and 13 and a position where it establishes communication between conduits 10 and 13 and 11 and 12.

For the purpose of operating the plug between the positions above described the valve is provided with a stem 18 which projects from one end of the body and which extends to the mechanism of the present invention.

The particular form of the invention shown in the drawings involves, generally, an operating lever 19 for actuating the valve stem 18, latches 20 and 21 for engaging and releasably holding the lever in predetermined positions, springs 22 and 23 connected to the lever and adapted to be tensioned so they operate the lever, power means 24 for alternately tensioning the springs 22 and 23, and control means 25 for the latches.

In the construction illustrated the lever 19 is fixed directly on the shaft or stem 18 of the valve and the various other parts of the mechanism are carried by or supported from a base plate 26 supported from the valve through suitable mounting members 27. The plate 26 is supported to lie in a plane transverse of the axis of the stem 18 and the lever 19 is mounted on the stem to operate at the face or front side of the plate. The lever 19 operates between the position shown in full lines in Fig. 1 to that shown in dotted lines in Fig. 1 in moving the plug of the valve between its two positions.

The latch 20 is carried by the plate to catch the arm 30 of the lever 19 upon its being moved to the position shown in full lines in Fig. 1, so that it prevents return of the arm to the position shown in dotted lines, while the latch 21 operates to catch and hold the arm 30 of the lever 19 upon its being moved to the position shown in dotted lines to prevent its return to the position shown in full lines. Each latch is hinged or shiftably connected to the plate 26 through an arm 33 and is urged out or so that it projects from the plate by means of a spring 34.

The particular form of control means illustrated in the drawings is an electrical control means involving electromagnets M mounted at the rear of the plate opposite the latches. The arrangement and relationship of parts is such that when the magnet opposite latch 20 is energized that latch is drawn back to release the lever arm and when the magnet opposite latch 21 is energized the latch 21 is drawn back to release the arm. Our present invention is no way concerned with means employed for energizing the magnets at the desired times. In Fig. 5 we show a very simple diagram illustrating the magnets M connected with a power circuit to be under control of the switches S.

The springs 22 and 23 are helical tension springs connected to arm 40 of lever 19. The springs are connected to the outer end of the arm 40 and extend, generally, in opposite directions from the arm, the relationship of parts being such that when the spring 22 is put under tension it will serve to move or operate the lever from the position shown in full lines to that shown in dotted lines, whereas when the spring 23 is tensioned it will serve to operate the lever 19 from the position shown in dotted lines to that shown in full lines.

The means 24 operates to alternately tension the springs 22 and 23 and utilizes power from a suitable source to accomplish this function. The means 24 includes, primarily, a reciprocating bar 41 to which the outer ends of the springs 22 and 23 are connected at suitably spaced points. In the case illustrated posts 42 project from the bar 41 and the springs 22 and 23 are connected to the posts. The bar moves or is adapted to be reciprocated horizontally between a position where it is at the left and tensions spring 22 and a position where it is at the right and tensions spring 23.

In accordance with the broader principles of our invention any suitable power means may be employed for reciprocating the rod 42 between the two positions just described. Where the mechanism is being employed to handle a valve and the valve is handling fluid under pressure it is advantageous to employ fluid pressure for operating the rod 41. In the drawings we have shown a form of means 24 employing fluid pressure handled by the valve as the means or power for operating the rod 41.

From the foregoing description of the valve operated by the mechanism of the present invention it will be apparent that when the plug of the valve is in one position fluid under high pressure will be delivered to conduit 12 while the conduit 13 is connected to the outlet or exhaust conduit 11 so the fluid therein will be under low pressure, whereas when the plug is in the other position the conduit 13 will be supplied with fluid under high pressure and the conduit 12 will be connected to the outlet conduit and the fluid therein will be under low pressure.

To utilize the fluctuation or variation in fluid pressure in conduits 12 and 13 we provide a cylinder 50 around the rod 41 and we provide a piston 51 on each end of the rod. One end, the lefthand end of the cylinder 50, is connected to the conduit 12 by fluid connection 52, while the other end of the cylinder, the righthand end, is connected to the conduit 13 by a fluid connection 53. The cylinder is supported from the base 26 and through the pistons 51 and supports the rod 41. The posts 42 provided on the rod to carry the ends of the springs project from the cylinder through a longitudinal slot 56 provided therein. The slot 56 may, if desired, be used as a means for limiting the movement or stroke of the rod.

From the foregoing description it will be apparent that when the plug of the valve has been positioned so that there is high pressure in conduit 13 and the arm 30 is held by latch 20 the pressure acting through connection 53 will act on the piston 51 at the righthand end of rod 41 causing the rod to be moved to the left and thus causing the spring 22 to be tensioned. When the spring 22 is thus tensioned the spring 23 may be fully released or contracted so that there is a substantial force tending to move the lever 19 from the position shown in full lines to that shown in dotted lines in Fig. 1. Upon energization of the electromagnet M opposite latch 20 the latch 20 will release the arm 30, whereupon the spring 22 being under tension will move the lever 19 from the position shown in full lines in Fig. 1 to that shown in dotted lines in Fig. 1, where it is caught by latch 21. This movement of the lever 19 changes the position of the plug of the valve so that high pressure is delivered to the conduit 12. As high pressure develops in conduit 12 immediately following the operation of the valve high pressure is communicated through the connection 52 to the lefthand piston 51 on the rod 41 with the result that the rod is forced to the right causing the spring 23 to be tensioned and the spring 22 to be fully contracted or released. The spring 23 will remain tensioned ready to operate the lever 19 until the magnet M controlling latch 21 is energized whereupon spring 23 will act to operate the valve back to the position where the lever 19 is caught and held by the latch 20. It is to be understood that the springs 22 and 23 act to move the lever 19 rapidly between the two positions above described and that there is some lag in the communication of high pressure to the ends of the cylinder 50, as above described, which allows the lever to be fully operated to the two positions to be effectively caught by the latches.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A mechanism for oscillating a shaft or the like including, a lever controlling the shaft, latches to hold the lever against movement between two positions, two helical tension springs connected with the lever and extending in opposite directions from the lever for moving the lever between said positions, means for alternately tensioning the springs for action, and means operable to selectively release the latches.

2. A mechanism for oscillating a shaft or the like including, a lever controlling the shaft, latches to hold the lever against movement between two positions, two springs connected with the lever for moving the lever between said positions, means for alternately flexing the springs for action including a cylinder, a rod in the cylinder, the springs being connected with spaced parts of the rod, and pistons on the rod operable in the cylinder by fluid pressure admitted to the cylinder, and means operable to selectively release the latches.

3. In combination, a valve operable between two positions to control flow of fluid to and from two distributing conduits so they are alternately under high and low pressure and having an operating stem, a valve operating lever fixed on and controlling the stem, latches engaged when the valve is moved to either of its two positions and holding the lever so the valve is held in either of its two positions, control means for the latches, and means operating the lever including a stationary cylinder, a reciprocating piston operable in the cylinder, tension springs connected to and extending between the lever and piston, a fluid connection between one conduit and the cylinder at one side of the piston and a fluid connection between the other conduit and the cylinder at the other side of the piston so that when the valve is in one position supplying pressure to one conduit fluid exhausts from the cylinder through the other conduit and force is applied tending to move the valve to the other position.

4. In combination, a valve operable between two positions to control flow of fluid to and from two distributing conduits so they are alternately under high and low pressure and having an operating stem, a lever controlling the stem, latches engaged when the valve is moved to either of its two positions and holding the lever so the valve is held in either of its two positions, control means for the latches, and means for operating the lever including a cylinder, a piston operable in the cylinder, tension springs connected with spaced parts of the piston with the lever so the lever is connected between them, a fluid connection between one conduit and the cylinder at one side of the piston and a fluid connection between the other conduit and the cylinder at the other side of the piston so that when the valve is in one position supplying pressure to one conduit fluid exhausts from the cylinder through the other conduit and force is applied tending to move the valve to the other position.

5. In combination, a valve operable between two positions to control flow of fluid to and from two distributing conduits so they are alternately under high and low pressure and having an operating stem, a lever controlling the stem, latches engaged when the valve is moved to either of its two positions and holding the lever so the valve is held in either of its two positions, control means for the latches, and means for operating the lever including, a cylinder, a rod in the cylinder, pistons on the rod operable in the cylinder, tension springs connected with spaced parts of the rod and with the lever so the lever is between them, a fluid connection between one conduit and the cylinder at one piston, and a fluid connection between the other conduit and the cylinder at the other piston, the valve when in one position supplying pressure to one piston and relieving it from the other piston so force is applied tending to move the valve to the other position.

6. In combination, a valve operable between two positions to control flow of fluid to and from two distributing conduits so they are alternately under high and low pressure and having an operating stem, a lever controlling the stem, latches engaged when the valve is moved to either of its two positions and holding the lever so the valve is held in either of its two positions, control means for the latches, and means for operating the lever including, a cylinder having a slot in it, a rod in the cylinder, spaced posts on the rod projecting through the slot, tension springs connected with the posts and with the lever, pistons on the rod, a fluid connection between one conduit and the cylinder at one piston, and a fluid connection between the other conduit and the cylinder at the other piston, the valve when in one position supplying pressure to one piston and relieving it from the other piston so force is applied tending to move the valve to the other position.

ROBERT HURD THOMPSON.
HERBERT HARVEY.

REFERENCES CITED

The following references are of record in the file of this patent:

UNITED STATES PATENTS

| Number | Name | Date |
|---|---|---|
| 117,701 | Vesper | Aug. 1, 1871 |
| 365,040 | Bassett | June 21, 1887 |
| 450,872 | Reardon | Apr. 21, 1891 |
| 525,092 | Clariot | Aug. 28, 1894 |
| 649,572 | Erickson | May 15, 1900 |
| 864,580 | Walter | Aug. 27, 1909 |
| 953,993 | Forbes | Apr. 5, 1910 |
| 1,065,363 | Hartman | June 24, 1913 |
| 1,217,513 | Simmon | Feb. 27, 1917 |
| 1,268,680 | Cates | June 4, 1918 |
| 1,426,718 | De Florez | Aug. 22, 1922 |
| 1,611,832 | Givens | Dec. 21, 1926 |
| 1,814,608 | Schuh | July 14, 1931 |
| 1,890,842 | Bull et al. | Dec. 13, 1932 |
| 1,932,976 | Lamb | Oct. 31, 1933 |
| 2,230,043 | Kleen | Apr. 15, 1941 |
| 2,253,183 | Le Count | Aug. 19, 1941 |
| 2,384,221 | Waldie | Sept. 4, 1945 |
| 2,425,007 | Rouse | Aug. 5, 1947 |
| 2,462,571 | Thompson et al. | Feb. 22, 1949 |

FOREIGN PATENTS

| Number | Country | Date |
|---|---|---|
| 629,162 | Germany | Apr. 23, 1936 |